3,365,383
LOW TEMPERATURE OZONE GENERATING MEANS
Richard L. Blair, 249 Mattson Ave., Los Gatos, Calif. 95030
Continuation-in-part of application Ser. No. 427,413, Jan. 22, 1965. This application Dec. 12, 1966, Ser. No. 601,200
7 Claims. (Cl. 204—321)

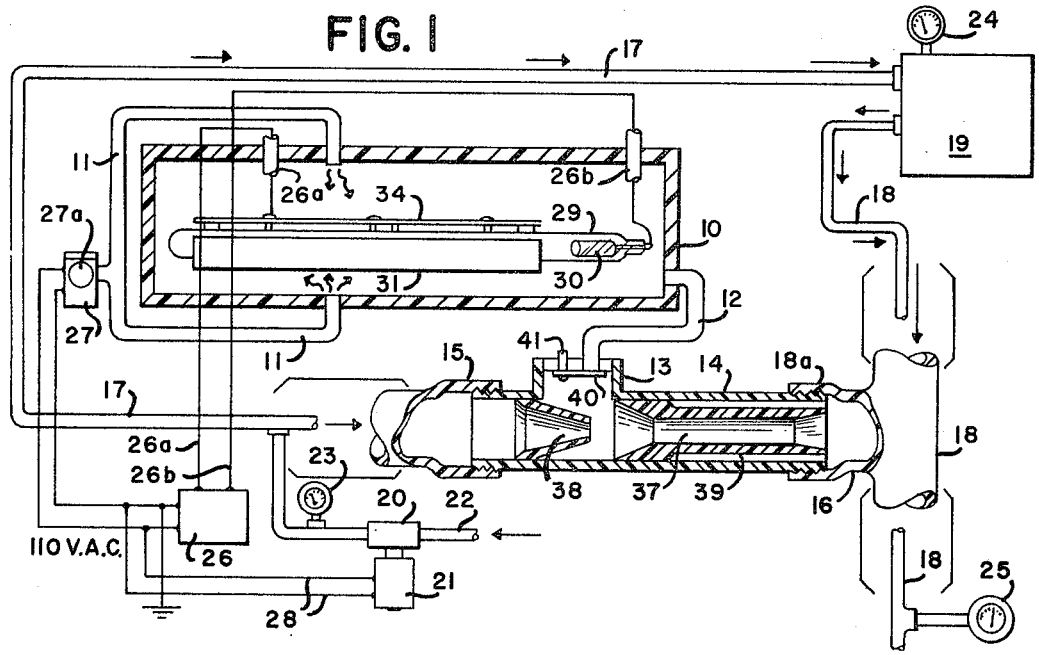
FIG. 1
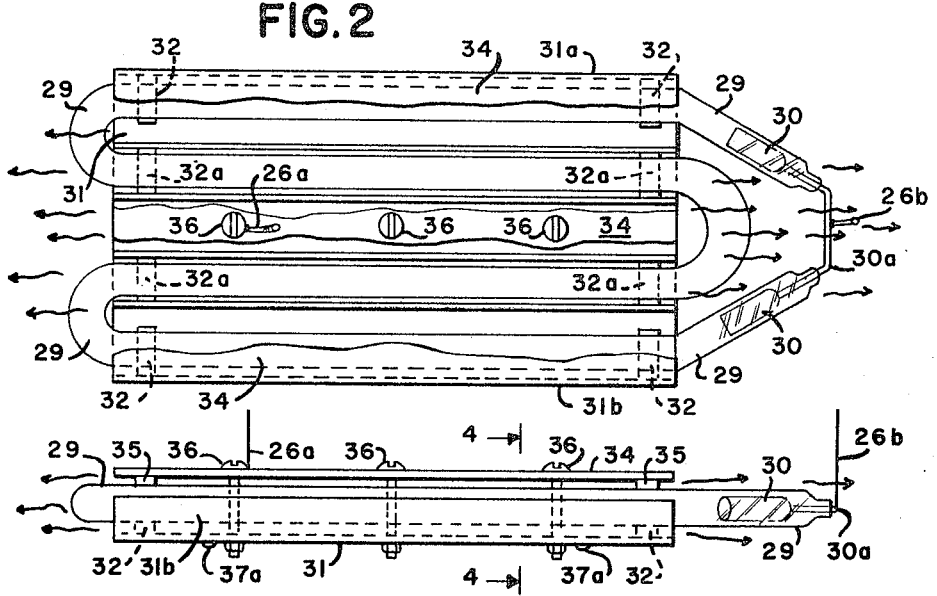
FIG. 2
FIG. 3
FIG. 4
INVENTOR.
RICHARD L. BLAIR
BY
Allen and Chromy
ATTORNEYS Jan. 23, 1968 R. L. BLAIR 3,365,383
LOW TEMPERATURE OZONE GENERATING MEANS
Filed Dec. 12, 1966 2 Sheets-Sheet 2
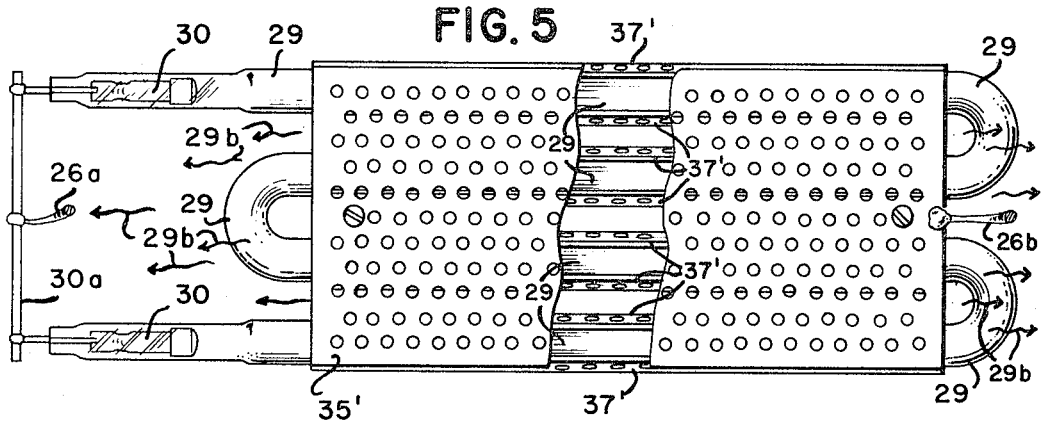
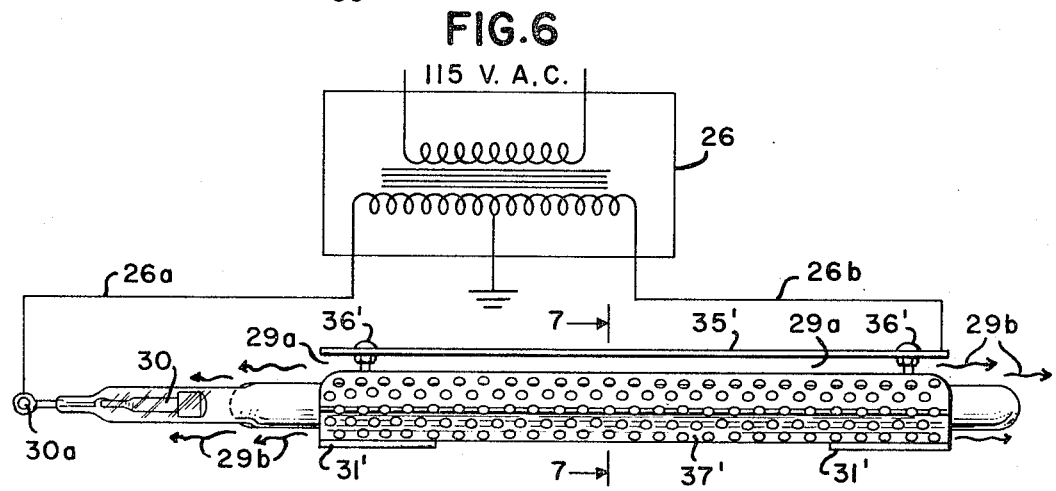
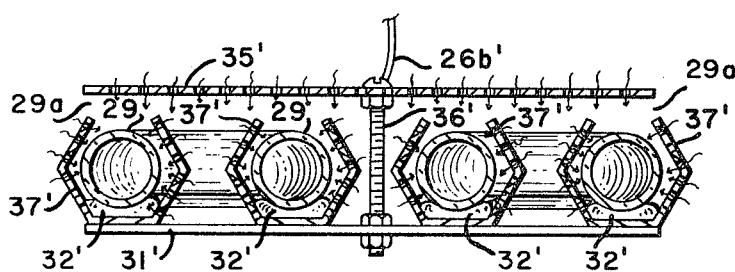
INVENTOR.
RICHARD L. BLAIR
BY
ATTORNEYS

United States Patent Office 3,365,383
Patented Jan. 23, 1968

This application is a continuation-in-part of my application Ser. No. 427,413, filed Jan. 22, 1965, now abandoned, for "Apparatus for Generating Ozone and Means for Injecting Same."

This invention relates to an apparatus for generating ozone and means for injecting the ozone into a water stream to be treated thereby.

An object of this invention is to provide an improved ozone generating device that is economical to manufacture and efficient in operation.

Another object of this invention is to provide an improved ozone generating device and ozone injecting means for feeding the ozone into a water stream to be treated thereby.

Still another object of this invention is to provide an improved ozone generating device that supplies the ozone to water to be treated through tubing or pipes that are made of plastic material which will not deteriorate after extended use with ozone.

Still another object of this invention is to provide an improved ozone generator which comprises vitreous tubing partially enclosed by metal plates, said tubing and metal plates being shaped into a substantially open ended structure, said tubing confining inert gas or gases under reduced pressure or mercury vapor under reduced pressure, or mixtures thereof, which are ionized when a source of high voltage is connected between electrodes provided to the tubing and said metal plates, whereby a corona discharge is produced between the tubing and the metal plates, said corona discharge producing ozone from the air provided to the area of the corona discharge and the ozone being forcibly ejected from the open ends of the generator structure.

Another object of this invention is to provide an improved ozone generator which comprises vitreous tubing partially enclosed by perforated metal plates spaced therefrom, said tubing and metal plates being shaped into a substantially open ended structure, said tubing also being provided with an atmosphere of rarefied inert gas or gases or mercury vapor, or mixtures thereof, which are adapted to be ionized when a source of high voltage is connected between electrodes provided to the tubing and the metal plates so that a corona discharge takes place between the tubing and the metal plates in which ozone is generated from the air supplied thereto, said perforations being small, having diameters on the order of $1/32$ to $1/16$ of an inch and which serve to facilitate the corona discharge and flow of air into said corona discharge.

Another object of this invention is to provide an improved ozone injector employing a nozzle arrangement through which the water to be treated with ozone is fed under pressure so that suction is produced in a portion of the injector to which the ozone supply is connected, and which is provided with a flap valve which controls the feeding of ozone to the suction chamber.

Still another object of this invention is to provide an ozone generator with injecting means for injecting the ozone into the filtered water being pumped into a swimming pool by providing an ozone injecting device directly into the line of the filtered water, or by providing the ozone injecting device in a line carrying some of the water which is bypassed around the filter for the swimming pool water.

Other and further objects of this invention will be apparent to those skilled in the art to which it relates from the following specification, claims and drawing.

In accordance with this invention I have provided an ozone generator of increased efficiency which is also characterized by its ability to run at a relatively low temperature without it being necessary to provide cooling fans or other cooling apparatus. This apparatus employs an elongated tube structure folded into a serpentine configuration provided with metal plates around and spaced from substantially straight portions of the tube. The tube is provided with a rarefied atmosphere and electrodes which are adapted to be connected to one side of a high voltage source, the other side of which is connected to the metal plates to provide a corona discharge therebetween. I have found that the open end elongated structure has the characteristic of providing inherent air circulation therethrough when high voltage is applied to the tube electrodes and the metal plates. Thus, air is sucked into the ozone generator structure through the gaps between the outer plates and also through the perforations in these plates and the ozonized air is ejected from the open ends of the structure. The ozonized air is so forcibly ejected from the open ends of the structure that a definite draft or wind manifests itself outwardly from these open ends. This inherent draft in the ozone generator structure not only ejects the ozonized air therefrom but also cools the tube and metal plates and dissipates heat generated by the corona discharge. As a result, the ozone generating capacity of the generator is not impaired by excessive heating thereof, but the ozone production is increased.

Referring to the drawing briefly:

FIG. 1 is a view showing the ozone generator and ozone injector connected to a branch line which is shunted around the water supply filter and which feeds the ozone impregnated water into the filtered water supply in which the ozone impregnated water is diluted;

FIG. 2 is a plan view of the electrode structure of the ozone generator with the top plate of the electrode structure removed;

FIG. 3 is a side view of the electrode structure of the ozone generator showing the open ended arrangement that facilitates outward flow of the ozone therefrom;

FIG. 4 is a sectional view taken along the line 4—4 of FIG. 3;

FIG. 5 is a plan view partially in section of a preferred form of ozone generator;

FIG. 6 is a side view of the generator shown in FIG. 5 and illustrates the electrical connections thereto from the high voltage secondary of the transformer; and FIG. 7 is a sectional view taken along the line 7—7 of FIG. 6.

Referring to the drawing in detail, reference numeral 10 designates the housing of the ozone generator which is provided with an inlet pipe 11 through which air is fed into the top or bottom, or both top and bottom, thereof. The housing may be made of plastic, metal or the like, and it is also provided with an outlet pipe 12. The outlet pipe 12 is connected to the suction chamber 13 of the ozone injector device 14, which may be of conventional construction. The housing of the ozone generator 10 and the pipes 11, 12, 13 and 14 are preferably made of plastic material that will not deteriorate after extended contact with ozone, such plastic comprising polypropylene, polyvinylchloride and the like.

The inlet of the injector device 14 is connected to the water pipe 15 which is connected to the pipe 17 leading to the pump 20. The outlet of the injector device 14 is connected to the pipe 16 which is connected to the pipe 18 that transports the filtered water from the outlet of the filter 19 which is of conventional construction. The pump 20 is driven by an electric motor 21 that is connected to the 110 v. A.C. supply line 28. The motor 21 drives the pump 20 so that water from the swimming pool (not shown) or any other tank containing liquid to be treated, is pumped through the pipe 22 into pipe 17 and supplied to the inlet of the filter 19.

The outlet of the filter 19 is connected to the pipe 18 and the filtered water passing through this pipe is mixed with the water carrying the ozone supplied through pipe 16 so that the ozone impregnated water is diluted by the filtered water. Suitable pressure gauges 23, 24 and 25 are connected to the system, as shown, to indicate the water pressure at different points of the system so that the operation thereof may be observed. Thus, the difference in pressure between that shown in gauges 23 and 25 gives an indication of how much pressure is being applied to the inlet of the injector device 14 with respect to the outlet thereof, whereby ozone impregnated water is forced or fed into the water stream in pipe 18. A suitable high voltage transformer 26 is provided to the system for supplying high voltage to the electrodes in the ozone generator for the production of ozone. The primary or input of transformer 26 is connected to the 110 v. A.C. line for energization thereof.

The air inlet pipe 11 to the housing 10 of the ozone generator may be provided with a solenoid controlled valve such as the valve 27 if it is desired to control the air supplied thereto. The electrical winding of this solenoid valve 27 is connected to the 110 v. line in parallel with the input of the transformer 26 so that this solenoid is energized when the transformer 26 and the water pump motor 21 are energized, and the inlet 27a to the inlet pipe 11 of the ozone generator is opened. When power supply is in off position, the solenoid valve 27 closes and prevents syphoning of water into housing 10 from the filter and heater or other tanks.

The electrode structure of the ozone generator is shown in detail in FIGS. 2 to 7, inclusive. One of the electrodes of this generator is made up of a vitreous tube 29 which may be made of material such as lead glass, borosilicate glass sold under the trademark Pyrex, fused quartz, or the like. Electrodes 30 are positioned in the end portions of the tube 29, and the external leads from these electrodes are connected together by the conductor 30a which is connected to the high voltage line 26b leading to the transformer 26, as shown in FIG. 1. The other line 26a from the transformer is connected to the metallic plates around the vitreous tube 29 and it is also grounded.

The tube 29 may be connected to the transformer 26, as shown in FIG. 1, and the insulated cable 26a and 26b employed to support the tube from the top of the plastic housing. The inside of the vitreous tube 29 is filled with a rarefied atmosphere of one of the inert gases such as neon, argon and the like, or mixtures thereof, with or without mercury vapor, and the vitreous tube may be made of ordinary lead glass. On the other hand, if the rarefied atmosphere inside of the tube 29 is made up of mercury vapor, then it is preferred to make this tube out of borosilicate glass or fused quartz so that the ultraviolet light produced in the rarefied mercury vapor may be transmitted out of the glass tube with minimum absorption and also used in the production of ozone. The vitreous tube 29 is of serpentine configuration having four arms, as shown in FIGS. 2 and 5, which are substantially parallel to each other.

The straight portions of these arms are spaced a short distance from metallic plates, as shown in FIGS. 4 and 7, and these metallic plates comprise the other electrode of the ozone generator. The metallic plates shown in FIGS. 2, 3 and 4 include the bottom plate 31 having sides 31a and 31b bent upward and slightly spaced from the outer sides of the vitreous tube 29. The top plate 34, which is connected by means of machine screws 36 to the bottom plate 31, is supported by small silicone rubber insulation pads 35 on the vitreous tube 29. The tube 29 rests on the silicone rubber insulation pads 32 and 32a which provide support for this tube and also provide spacing between the tube 29 and the bottom plate 31. The inside arms 29 of the vitreous tube are positioned in channel members 37, also made of metal, and these arms of the vitreous tube are supported in these channels by the silicone rubber strips 32a. Channels 37 are attached to the bottom plate 31 by the rivets 37a.

The metal plates employed with the vitreous tube shown in FIGS. 5, 6 and 7 are of slightly different configuration from the metallic plates employed with the tube shown in FIGS. 3 and 4. The straight portions of the tube 29 are positioned in channel members 37' having an angular configuration, as shown in FIG. 7, in order to bring the side walls and bottom of these channel members as close to the tube 29 as possible. These channel members 37' are attached to the cross members 31' by spot welding, brazing, soldering or the like. The straight arms of the tube 29 are supported in the channel members 37' by pieces of silicone rubber 32'. The top plate 35' is supported from the cross pieces 31' by the bolts or machine screws 36'.

The channel members 37' and the top member 35' are all perforated by small closely spaced perforations which are on the order of $\frac{1}{32}$ inch to $\frac{1}{16}$ inch in diameter and the faces of the channel members 37' and top member 35'. These perforations provide curved edges from which the brush or corona discharges take place, and closely spacing these perforations serves to distribute the corona discharges over greater areas of the plates than is possible if smooth, flat plates are used without perforations. Also, these small holes provide a multitude of air inlet ports so that air is supplied therethrough to the ozone producing corona discharge.

When high voltage on the order of 15,000 volts is applied by the connections 26a and 26b to the electrode structure, including the tube 29 and metal plates described, the rarefied atmosphere inside of the vitreous tube 29 is ionized and a corona discharge is produced in the gaps between the vitreous tube and the surrounding metallic plate structure. Air is drawn into the electrode structure through the gaps 29a and also through the perforations shown in FIGS. 5 and 6, and the oxygen in the air passing through the corona discharge between the vitreous tube 29 and the surrounding metallic plates is converted into ozone which is ejected from the open ends of the ozone generator in the directions indicated by the arrows 29b. The ozone generated is mixed with air and is sucked out of the housing of the ozone generator through the pipe 12 into the suction chamber 13 of the injector device 14. The injector device 14 is provided with a nozzle 38 through which water is forced under pressure and in which the speed of the water flow is increased because of the tapered nature thereof. The other nozzle 37 of the injector device is of gradually expanding cross section. When water is passed through the injector device 14 suction of between 2 and 3 pounds is produced in the suction chamber 13 with the result that the valve flap 40 is pulled down and the outlet of pipe 12 is opened into the suction chamber. The valve flap 40 may be made of pliable material such as silicone rubber, and it is attached to the wall of the suction chamber by the rivet or screw 41. When suction in the chamber 13 opens the valve flap 40, it draws the ozone into the chamber 13 from the pipe 12 and from the housing of the ozone generator. If back pressure develops in line 18a it causes flap 40 to close and thus prevents water entry to pipe 12 and ozone generator so that water damage thereto is prevented.

While I have shown a preferred embodiment of the invention, it will be understood that the invention is capable of variation and modification from the form shown so that the scope thereof should be limited only by the scope of the claims appended hereto.

What I claim is:

1. In apparatus for generating ozone, the combination comprising an elongated vitreous tube having a serpentine configuration having a plurality of substantially straight portions, said tube having a rarefied gaseous atmosphere therein, an elongated metallic channel member partially enclosing said substantially straight portion of said vitreous tube, and spaced therefrom providing a cooling zone for said tube electrode means in said tube, means connected to said electrode means and said channel member producing a high voltage corona discharge between said vitreous tube and said channel member, said elongated channel member having a longitudinally extending opening through which air is drawn into the corona discharge between said tube and said channel member, said air drawn into said corona cooling said tube and furnishing oxygen for the production of ozone, the ends of said channel member being open through which the ozonized air is expelled from said channel member.

2. In apparatus for generating ozone, the combination as set forth in claim 1 further characterized in that said channel member is provided with a plurality of small closely spaced perforations which distribute the corona discharge over surfaces thereof.

3. In apparatus for generating ozone, the combination as set forth in claim 1 further characterized in that said channel member is provided with a plate electrically connected thereto and partially covering said opening.

4. In apparatus for generating ozone, the combination as set forth in claim 2 further characterized in that said channel member is bent around said tube to provide closer spacing therebetween and said opening being wide enough so that said tube may be inserted into said channel member therethrough.

5. In apparatus for generating ozone, the combination as set forth in claim 4, further characterized in that said channel member is provided with a plate positioned over said opening and spaced from said channel member, and means electrically connecting said plate to said channel member.

6. In apparatus for generating ozone, the combination as set forth in claim 4 further characterized in that said tube is supported in said channel member by pieces of silicone rubber.

7. In apparatus for generating ozone, the combination as set forth in claim 6, further characterized in that said tube and said channel member are supported in a housing by insulated electric cable connected thereto.

References Cited

UNITED STATES PATENTS

| | | | |
|---|---|---|---|
| 397,992 | 2/1889 | Merkel | 204—314 |
| 996,560 | 6/1911 | Bradley | 210—192 |
| 1,065,246 | 6/1913 | Held | 210—192 |
| 1,842,090 | 1/1932 | Ferguson | 210—192 |
| 2,288,132 | 6/1942 | Hartman | 204—320 |
| 2,785,012 | 3/1957 | Frewin | 137—604 |
| 2,808,374 | 10/1957 | Mueller et al. | 204—313 |
| 2,820,701 | 1/1958 | Leslie | 210—169 |
| 3,042,071 | 7/1962 | Van Tuyl | 137—604 |
| 3,235,325 | 2/1966 | Storchheim | 204—314 |
| 3,243,046 | 3/1966 | Kakumoto | 210—199 |

FOREIGN PATENTS

| | | |
|---|---|---|
| 452,456 | 8/1936 | Great Britain. |
| 1,124,019 | 1/1962 | Germany. |

ROBERT K. MIHALEK, *Primary Examiner.*